US011328320B1

(12) United States Patent
Le Chevalier et al.

(10) Patent No.: US 11,328,320 B1
(45) Date of Patent: *May 10, 2022

(54) FRAUDULENT CONTENT DETECTOR USING AUGMENTED REALITY PLATFORMS

(71) Applicant: Wells Fargo Bank, N.A., San Francisco, CA (US)

(72) Inventors: Vincent Le Chevalier, San Jose, CA (US); Andres J. Saenz, Cape Coral, FL (US)

(73) Assignee: Wells Fargo Bank, N.A., San Francisco, CA (US)

(*) Notice: Subject to any disclaimer, the term of this patent is extended or adjusted under 35 U.S.C. 154(b) by 66 days.

This patent is subject to a terminal disclaimer.

(21) Appl. No.: 16/875,586

(22) Filed: May 15, 2020

Related U.S. Application Data

(63) Continuation of application No. 15/587,463, filed on May 5, 2017, now Pat. No. 10,699,295.

(51) Int. Cl.
*G06Q 30/02* (2012.01)
*G06F 16/951* (2019.01)
*G06K 9/62* (2022.01)

(52) U.S. Cl.
CPC ....... *G06Q 30/0248* (2013.01); *G06F 16/951* (2019.01); *G06K 9/6267* (2013.01); *G06V 2201/06* (2022.01)

(58) Field of Classification Search
None
See application file for complete search history.

(56) References Cited

U.S. PATENT DOCUMENTS

| 7,519,562 | B1 * | 4/2009 | Vander Mey | G06Q 99/00 705/500 |
| 8,126,882 | B2 | 2/2012 | Lawyer | |
| 8,245,282 | B1 | 8/2012 | Buckwalter et al. | |
| 9,471,604 | B2 | 10/2016 | Chittar et al. | |
| 9,721,147 | B1 | 8/2017 | Kapczynski | |

(Continued)

FOREIGN PATENT DOCUMENTS

| KR | 10-1659064 B1 * | 9/2009 | ............. G06Q 50/30 |
| KR | 20110125866 A | 11/2011 | |

OTHER PUBLICATIONS

A Study on E-mail Image Spam Filtering Techniques, Dhanaraj et al., Proceedings of the 2013 International Conference on Pattern Recognition, Informatics and Mobile Engineering (PRIME) Feb. 21-22.*

(Continued)

*Primary Examiner* — David J Stoltenberg
(74) *Attorney, Agent, or Firm* — Merchant & Gould P.C.

(57) ABSTRACT

An augmented reality (AR) electronic computing device for determining a likelihood of fraudulent content in an advertisement includes receiving a digital image of the advertisement. A dataset of information relating to the advertisement is extracted from the digital image. Content related to the advertisement is identified from the dataset of information. The identified content is used to request identification information regarding the advertisement. The identification information and supplemental information are used to calculate a scam score for the advertisement. The scam score indicates the likelihood of fraudulent content in the advertisement.

20 Claims, 5 Drawing Sheets

(56) References Cited

U.S. PATENT DOCUMENTS

| | | | |
|---|---|---|---|
| 9,798,954 B1* | 10/2017 | Liu | G06K 9/6202 |
| 10,277,628 B1 | 4/2019 | Jakobsson | |
| 10,452,908 B1* | 10/2019 | Ramanathan | G07D 7/14 |
| 10,475,100 B1 | 11/2019 | Herz et al. | |
| 10,810,663 B1* | 10/2020 | Flowers | G06F 40/40 |
| 10,825,028 B1* | 11/2020 | Kramme | G06Q 20/34 |
| 2003/0091189 A1 | 5/2003 | Rhoads | |
| 2004/0046774 A1 | 3/2004 | Rhoads et al. | |
| 2004/0213437 A1 | 10/2004 | Howard et al. | |
| 2006/0068755 A1 | 3/2006 | Shraim et al. | |
| 2006/0251068 A1 | 11/2006 | Judge et al. | |
| 2007/0099683 A1 | 5/2007 | Panther Trice et al. | |
| 2007/0129999 A1 | 6/2007 | Zhou et al. | |
| 2007/0179849 A1 | 8/2007 | Jain | |
| 2007/0299777 A1 | 12/2007 | Shraim et al. | |
| 2008/0008348 A1 | 1/2008 | Metois et al. | |
| 2008/0010166 A1 | 1/2008 | Yang et al. | |
| 2008/0114709 A1 | 5/2008 | Dixon et al. | |
| 2008/0154667 A1 | 6/2008 | Kuo et al. | |
| 2009/0165128 A1 | 6/2009 | McNally et al. | |
| 2009/0240578 A1 | 9/2009 | Lee et al. | |
| 2009/0240735 A1 | 9/2009 | Grandhi et al. | |
| 2010/0186088 A1 | 7/2010 | Banerjee et al. | |
| 2010/0287041 A1 | 11/2010 | Desikan et al. | |
| 2011/0145051 A1 | 6/2011 | Paradise et al. | |
| 2011/0314031 A1 | 12/2011 | Chittar et al. | |
| 2012/0158632 A1 | 6/2012 | Grenier et al. | |
| 2012/0185393 A1 | 7/2012 | Atsmon et al. | |
| 2012/0209726 A1 | 8/2012 | Dean et al. | |
| 2012/0222111 A1 | 8/2012 | Oliver et al. | |
| 2012/0265755 A1 | 10/2012 | McNally et al. | |
| 2012/0271712 A1* | 10/2012 | Katzin | G06Q 20/20 705/14.51 |
| 2012/0272305 A1 | 10/2012 | Buckwalter et al. | |
| 2013/0014020 A1 | 1/2013 | Dixon et al. | |
| 2013/0097176 A1 | 4/2013 | Khader et al. | |
| 2013/0138428 A1 | 5/2013 | Chandramouli et al. | |
| 2013/0144765 A1 | 6/2013 | Gao et al. | |
| 2013/0185802 A1 | 7/2013 | Tibeica et al. | |
| 2013/0263272 A1 | 10/2013 | Banerjee et al. | |
| 2013/0282479 A1 | 10/2013 | Kuo et al. | |
| 2013/0282722 A1 | 10/2013 | Grenier et al. | |
| 2013/0315445 A1 | 11/2013 | Schlieski et al. | |
| 2013/0325550 A1 | 12/2013 | Varghese et al. | |
| 2013/0339186 A1 | 12/2013 | French et al. | |
| 2014/0025481 A1 | 1/2014 | Kang et al. | |
| 2014/0081701 A1 | 3/2014 | Lakshminarayanan et al. | |
| 2014/0081706 A1 | 3/2014 | Varghese et al. | |
| 2014/0105489 A1 | 4/2014 | Chittar et al. | |
| 2014/0129288 A1 | 5/2014 | Eager et al. | |
| 2014/0172552 A1 | 6/2014 | Raab et al. | |
| 2014/0172570 A1 | 6/2014 | y Arcas et al. | |
| 2014/0201126 A1 | 7/2014 | Zadeh et al. | |
| 2014/0258169 A1 | 9/2014 | Wong et al. | |
| 2014/0358671 A1 | 12/2014 | Wei | |
| 2015/0022675 A1 | 1/2015 | Lord et al. | |
| 2015/0150107 A1* | 5/2015 | Piliouras | G06F 21/6218 726/7 |
| 2015/0170209 A1 | 6/2015 | Smith et al. | |
| 2015/0235177 A1 | 8/2015 | Shraim et al. | |
| 2015/0237061 A1 | 8/2015 | Shraim et al. | |
| 2015/0254566 A1 | 9/2015 | Chandramouli et al. | |
| 2015/0294377 A1 | 10/2015 | Chow | |
| 2015/0324848 A1 | 11/2015 | Graham et al. | |
| 2016/0005050 A1* | 1/2016 | Teman | G06Q 30/018 705/317 |
| 2016/0070709 A1 | 3/2016 | Luan et al. | |
| 2016/0171202 A1 | 6/2016 | Goad | |
| 2016/0253679 A1 | 9/2016 | Venkatraman et al. | |
| 2016/0283975 A1* | 9/2016 | Kaul | G06Q 50/01 |
| 2016/0308932 A1 | 10/2016 | Gibbons et al. | |
| 2017/0004632 A1 | 1/2017 | Chittar et al. | |
| 2017/0011409 A1 | 1/2017 | Eager et al. | |
| 2017/0148025 A1 | 5/2017 | Le et al. | |
| 2018/0107682 A1 | 4/2018 | Wang et al. | |
| 2018/0107902 A1 | 4/2018 | Yang et al. | |
| 2018/0192160 A1 | 7/2018 | Ravindran et al. | |
| 2018/0204111 A1 | 7/2018 | Zadeh et al. | |
| 2018/0267946 A1* | 9/2018 | Dang | G06T 1/0021 |
| 2018/0268015 A1 | 9/2018 | Sugaberry | |
| 2018/0308159 A1 | 10/2018 | Knijnik et al. | |
| 2019/0122258 A1* | 4/2019 | Bramberger | G06Q 30/0248 |
| 2019/0272549 A1* | 9/2019 | Mossoba | G06K 9/00456 |
| 2020/0067861 A1 | 2/2020 | Leddy et al. | |
| 2020/0090196 A1 | 3/2020 | de Saint Leger et al. | |

OTHER PUBLICATIONS

A network-based approach to detect spammer groups, Thuy Do et al., 978-1-5090-0620-5/16/$31.00c 2016 IEEE.*

Detecting Frauds in Restaurant Reviews, Yang et al, 2013 International Conference on Computer Sciences and Applications.*

An Intelligent Approach to Review Filtering and Review Quality Improvement, Yu Sun et al., 2016 4th Intl Conf on Applied Computing and Information Technology/3rd Intl Conf on Computational Science/Intelligence and Applied Informatics/1st Intl Conf on Big Data, Cloud Computing, Data Science & Engineering.*

Trustworthiness Evaluation System in E-Commerce Context; Dalvi et al., Conference Paper • Aug. 2016, DOI: 00.1109/ICCUBEA. 2016.7860036.*

Chen et al., "Efficient Extraction of Robust Image Features on Mobile Devices," ISMAR '07: Proceedings of the 2007 6th IEEE and ACM International Symposium on Mixed and Augmented Reality, Washington, DC, , pp. 287-288. IEEE, Nov. 13, 2007.

Dhanaraj et al., "A Study on E-mail Image Spam Filtering Techniques," Proceedings of the 2013 International Conference on Pattern Recognition, Informatics and Mobile Engineering (PRIME) pp. 49-55 IEEE, Feb. 21-22, 2013.

* cited by examiner

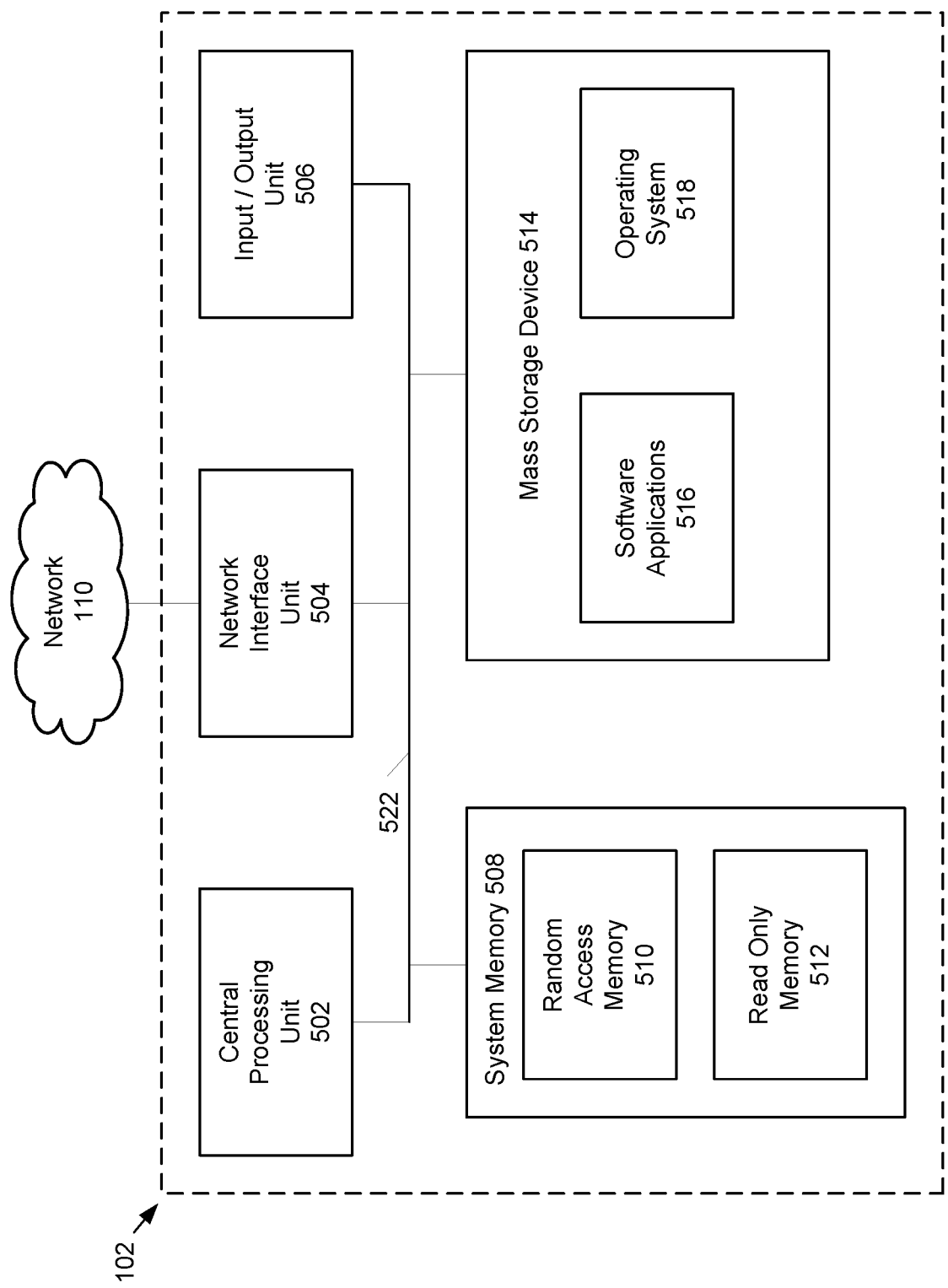

FRAUDULENT CONTENT DETECTOR USING AUGMENTED REALITY PLATFORMS

CROSS-REFERENCE TO RELATED APPLICATIONS

This application is a continuation of U.S. patent application Ser. No. 15/587,463, filed May 5, 2017, entitled, "Fraudulent Content Detector Using Augmented Reality Platforms." The disclosure of this priority application is hereby incorporated by reference in its entirety into the present application.

BACKGROUND

Documents and videos containing fraudulent content, sometimes known as scam, can frequently be found in printed material, in videos and on the Internet. The fraudulent content can include misleading or untrue statements, pictures or videos that have been edited to include misleading or untrue depictions of events and people and misleading or fraudulent offers of products, vacation trips and other items.

Advertisements, both in printed material and in videos, can also include scam content. However, sometimes it may not be easy to distinguish scam advertisements from reputable advertisements.

SUMMARY

Embodiments of the disclosure are directed to a method implemented on an augmented reality (AR) electronic computing device for determining a likelihood of fraudulent content in an advertisement. The method comprises: using the AR electronic computing device, receiving a digital image of the advertisement; extracting a dataset of information relating to the advertisement from the digital image; identifying content related to the advertisement from the dataset of information; using the identified content, requesting identification information regarding the advertisement; and using the identification information and supplemental information, calculating a scam score for the advertisement, the scam score indicating the likelihood of fraudulent content in the advertisement.

In another aspect, a method implemented on an augmented reality (AR) electronic computing device for identifying fraudulent content in an advertisement comprises: using the AR electronic computing device, receiving a digital image of the advertisement; extracting a dataset of information relating to advertisement from the digital image; identifying actionable content related to the advertisement from the dataset of information; using the actionable content to request identification information regarding the advertisement; receiving the identification information; using the identification information, requesting supplemental information regarding the advertisement; receiving feedback information regarding the advertisement and an advertiser associated with the advertisement; using the feedback information, calculating values for coefficients in an equation for a scam score for the advertisement; calculating the scam score for the advertisement, the scam score indicating the likelihood of fraudulent content in the advertisement; and when the scam score is greater than a predetermined threshold, determining that the advertisement has a high likelihood of containing the fraudulent content.

In yet another aspect, an electronic computing device comprises: a processing unit; and system memory, the system memory including instructions which, when executed by the processing unit, cause the electronic computing device to: receive a digital image of an advertisement; extract a dataset of information relating to advertisement from the digital image; identify actionable content related to the advertisement from the dataset of information; use the actionable content to request identification information regarding the advertisement; receive an identifier for the advertisement and an identifier for an advertiser associated with the advertisement; request feedback information regarding the advertisement and the advertiser, the request for the feedback information comprising one or more commands for an application programming interface (API) on a server computer; receive feedback for a plurality of categories regarding the advertisement and the advertiser; analyze feedback received for the plurality of categories; for each item of feedback received, determine a value of a coefficient for an equation for calculating a scam score for the advertisement, the value representing an extent to which the item of feedback received is positive or negative; determine a weighting factor to be used for the feedback in each of the plurality of categories; calculate the scam score for the advertisement comprising: for each of the plurality of categories, calculate a sum of each coefficient value multiplied by the weighting factor; and add each calculated sum to calculate the scam score; and when the scam score is greater than a predetermined threshold, determine that the advertisement has a high likelihood of containing fraudulent content.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows example physical components of the AR mobile device of FIG. 1.

DETAILED DESCRIPTION

Figure 1:
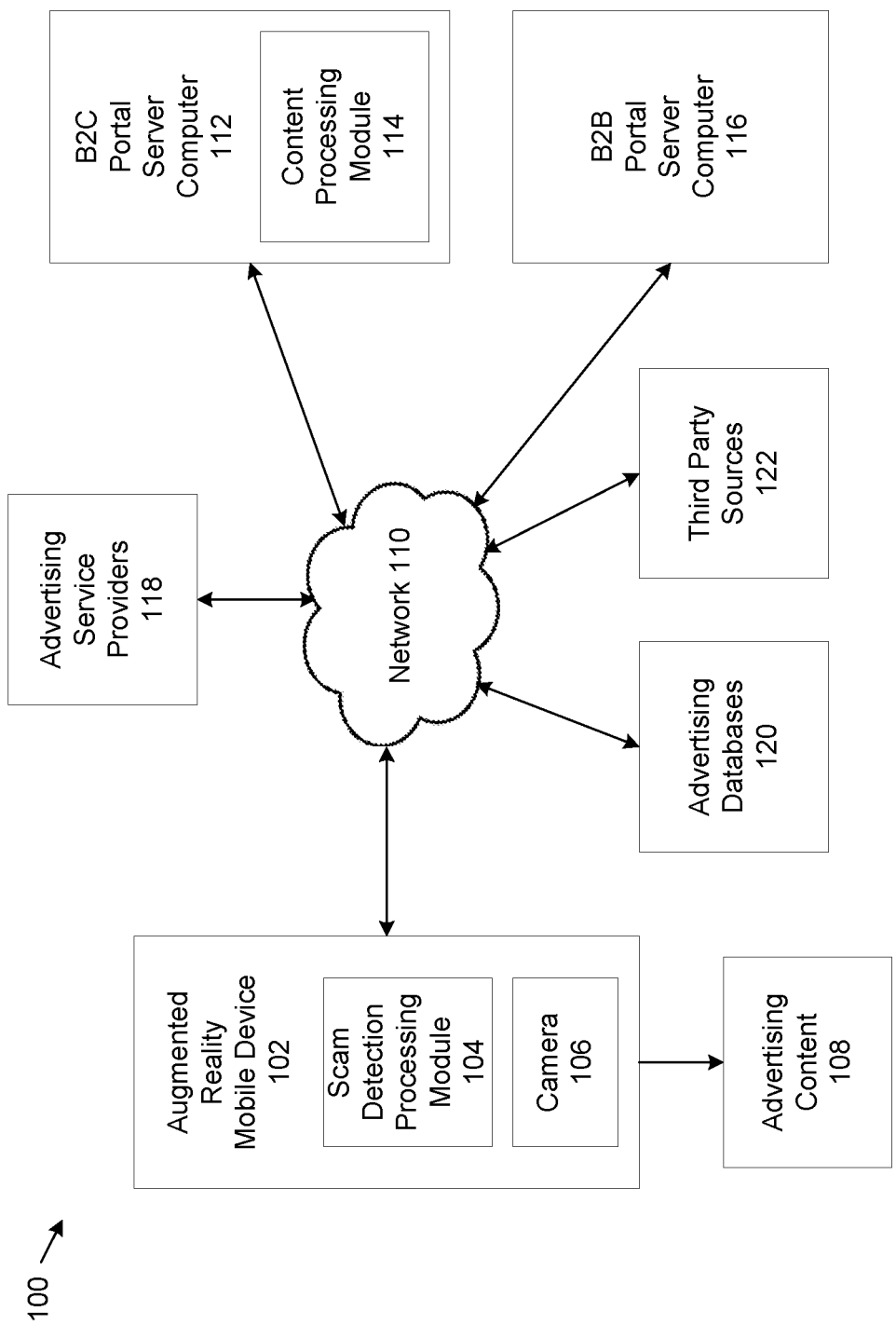
FIG. 1 shows an example system that supports scam detector services in augmented reality platforms.

The present disclosure is directed to systems and methods for using an augmented reality (AR) electronic computing device to automatically detect fraudulent material in content (e.g., documents and videos) scanned by the AR electronic computing device.

Using the systems and methods, a dataset is extracted from a digital scan of the documents and videos. The dataset comprises content that is representative of the documents and videos. For example, if a document is an advertisement for a vacation trip to Hawaii, the dataset can include the words "Hawaii," "vacation," "islands," "palm trees", "beach," "ocean," "resort," "offer," "rewards points" and other words that can be representative of the advertisement.

The dataset is processed and correlated into key information that can be used to match advertising offerings in an existing advertising offer database. The key information can also be referred to as actionable content because the advertising offers can effectively ask a user to initiate an action, such as dialing a telephone number or accessing a website to accept the offer. Example key information can include one or more of brand and product names, telephone numbers, website addresses, mailing addresses, and printed and audio keywords. Other key information is possible.

Supplemental information can also be obtained for actionable content that is correlated with the existing advertising offerings. The supplemental information can include items such as internal consumer feedback, external consumer data feedback, publishing data for the advertising offerings, and product branding data for the advertising offering. Other supplemental information is possible.

A scam level assessment can be performed on the documents and videos using the correlated actionable content and the supplemental information. A scam score can be generated which can determine a likelihood of whether a document or video contains scam content. When the scam score is greater than a predetermined threshold, a determination can be made that the document or video contains scam content.

For this disclosure, the documents can comprise both printed documents and electronic documents. The documents can contain text alone, a combination of text and one or more photographs or just one or more photographs. The documents can also be viewed when browsing the Internet. The videos can be streamed over the Internet or downloaded onto a user device.

In an example implementation using the systems and methods, the AR electronic computing device can use an application programming interface (API) on an Internet portal device to access one or more advertising databases, third party databases and advertising service providers. As discussed in more detail later herein, the Internet portal device can comprise a business to consumer (B2C) portal device. The B2C portal device can be used in conjunction with a business to business (B2B) portal device to access the one or more advertising databases, third party databases and advertising service providers to obtain matching advertising offers and supplemental information. The B2B portal device can also provide a gateway for advertising service providers, such professional advertisers, to submit advertising offerings to the advertising databases. These advertising offerings can be viewed by a user of the AR electronics device.

The systems and methods disclosed herein are directed to a computer technology that can identify fraudulent material (scam content) in a printed or video advertisement. An AR mobile device can be used to scan the printed or video advertisement and automatically provide an indication to a user of the AR mobile device as to risk of scam content in the printed or video advertisement. By extracting a dataset from the scanned printed or video advertisement, actionable content in the database can be used to identify the advertisement in an advertising database. Once the advertisement is identified, other databases and third party sources can be accessed to obtain supplemental information regarding the advertisement, such as feedback from consumers, professional reviewers and advertisers. The supplemental information can be compiled, weighted and used in an equation that can provide a scam score for the advertisement. The value of the scam score can predict the risk of scam in the advertisement.

FIG. 1 shows an example system 100 that can support scam detector services in augmented reality platforms. System 100 includes an augmented reality (AR) mobile device 102, advertising content 108, a network 110, a B2C portal server computer 112, a B2B portal server computer 116, advertising service providers 118, advertising databases 120 and third party sources 122. AR mobile device 102 includes a scam detection processing module 104 and a camera 106. B2C portal server computer 112 includes content processing module 114. More, fewer or different components can be used.

The example AR mobile device 102 is a mobile electronic computing device with AR functionality. In one example implementation, AR mobile device 102 can be a smartphone that includes an AR software application. In another example implementation, AR mobile device 102 can comprise a headset that can be worn by a user. The headset can include a wearable computer, a camera and an optical display. The wearable computer can also include voice recognition capability that can permit the user to direct the wearable computer via voice commands. Other examples of AR mobile device 102 are possible.

The example scam detection processing module 104 can extract a dataset from a document or video scanned by camera 106 of AR mobile device 102. Scam detection processing module 104 can also process the dataset and search for actionable content that can be used to access an advertising offer database. Scam detection processing module 104 can also use information from the advertising offer database and supplemental information to calculate a scam score for the scanned document or video. A detailed explanation of how the scam score is calculated is provided later herein.

Advertising content 108 can comprise an advertising document or video viewed and scanned by the camera in AR mobile device 102. The document can be a printed advertisement that can be included in a newspaper, magazine or other printed material or an electronic document that can be viewed on an electronic computing device of the user, for example when browsing the Internet. The video can be an advertisement that can be viewed on an electronic computing device of the user or streamed over the Internet. An advertising document can include text, photographs, graphics, logos, equations, cartoon figures and other similar content. An advertising video can include text, photographs, logos, equations, cartoon figures and animation.

The example network 110 is a computer network such as the Internet. AR mobile device 102 can wirelessly connect to B2C portal server computer 112 via network 110. In addition, one or more of B2C portal server computer 112, B2B portal server computer 116, advertising service providers 118 and advertising databases 120 can communicate using network 110.

The example B2C portal server computer 112 is a server computer that can provide a gateway for AR mobile device 102. B2C portal computer 112 can include an API interface that can accept API commands from AR mobile device 102. For example, an API command can be a query that include one or more items of actionable content as parameters. The response to the query can be one or more advertising offers that match the parameters. B2C portal server computer 112 can process the query and use network 110 to access B2B portal server computer 116, which in turn can access advertising databases 120 and return any matched advertising offers to B2C portal server computer 112. In some implementations, B2C portal server computer can access advertising databases 120 directly over network 110. B2C portal server computer 112 can respond to the query by returning any matched advertising offers to AR mobile device 102.

The example content processing module 114 processes API requests from a user at AR mobile device 102 and in turn can make requests to one or more of B2B portal server computer 116 and advertising databases 120 to obtain requested data. The content processing module 114 also compiles data responses containing matched advertising offers and supplemental information and returns the matched advertising offers and supplemental information to AR mobile device 102. In addition, in an example implementation, content processing module 114 compiles feedback scores from supplemental information for different categories and returns the feedback scores to AR mobile device 102. The feedback scores are used by scam detection processing module 104 to calculate a scam score, as discussed in more detail later herein. Content processing module 114 is discussed in more detail later herein.

The example B2B portal server computer 116 is a server computing that can provide a gateway to business-to-business websites. Example business-to-business websites can include advertising service providers 118 and advertising databases 120. B2B portal server computer 116 can use API interfaces of the business-business websites to obtain data from the business-business websites. B2B portal server computer 116 can convert requests for data from B2C portal server computer 112 into API commands used by the business-business websites, obtain the requested data from the business-business websites and return the requested data to B2C portal server computer 112. B2B portal server computer 116 can also provide a gateway for advertising service providers, such as professional advertisers, to upload advertising offerings to one of advertising databases 120.

The example advertising service providers 118 can comprise websites from one or more of advertising agencies, corporations, affiliates and other providers of advertising content. These websites can provide information regarding brand rankings of advertising offerings, consumer feedback to particular advertising products, professional review feedback to particular advertising products and other information.

The example advertising databases 120 comprise one or more databases that compile information on advertisement offerings from advertisement companies. The advertisement offerings can comprises both print and video advertisements. Advertising databases 120 can be searched via the use of key terms, such as the actionable content from scam detection processing module 104, to look for advertising offerings that match scanned documents or videos corresponding to the actionable content. One or both of B2C portal server computer 112 and B2B portal server computer 116, depending on an implementation being used, can access advertising databases 120.

The example third party sources 122 are electronic computing devices, for example social media server computers, that can provide internal consumer feedback for AR mobile device 102. The internal consumer feedback can comprise feedback from registered users of mobile AR scam detection devices, similar to AR mobile device 102. The internal consumer feedback can comprise consumer reviews and can be segmented based on users profile, such as age group, gender, race, estimated income, geography, social postings and other profile information that can be obtained from public and private records. The third party sources 122 can also provide external consumer feedback for AR mobile device 102. The external consumer feedback can comprise feedback from consumer or professional review websites that may have already captured consumer feedback associated with a particular advertising product. Third party sources 122 also include third party databases, such as databases from consumer and professional review websites.

Figure 2:
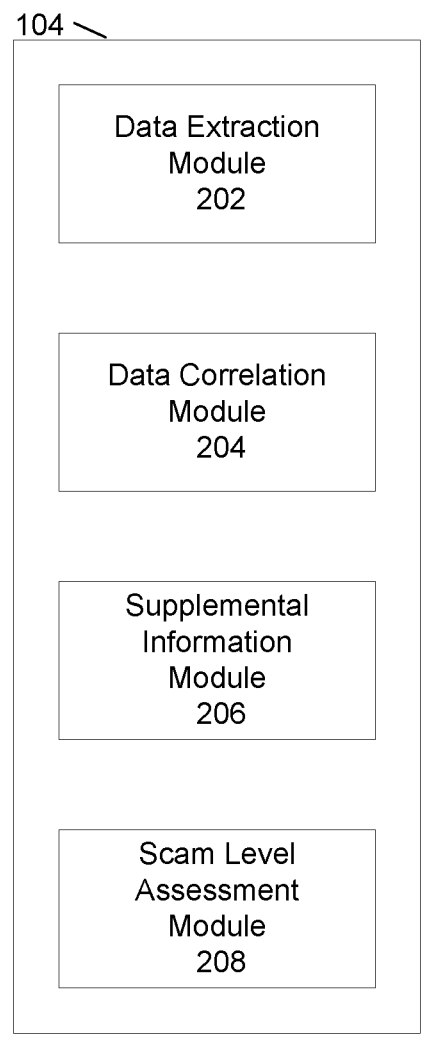
FIG. 2 show example modules of the scam detection processing module of FIG. 1.

FIG. 2 shows example modules of scam detection processing module 104. The example modules include data extraction module 202, data correlation module 204, supplemental information module 206 and scam level assessment module 208. More, fewer or different modules are possible.

The example data extraction module 202 processes a digital image of an advertising document or video that is scanned by the camera of AR mobile device 102. Data extraction module 202 extracts content from the scanned digital image that is representative of the documents and videos and creates a dataset containing the extracted content.

Data extraction module 202 can use a plurality of techniques to extract the content from the scanned digital image. The techniques can include video frame de-interleaving, key frame interpolation, picture alignment, picture aspect ratio normalization, audio filtering and key words deconstruction, logo extraction, page layout analysis, line and word detection, character segmentation and phone number and website address identification. Other techniques are possible.

The example data correlation module 204 process the dataset and correlates the extracted dataset into actionable content that can be used to search an existing offer database. The actionable content can be used to match an existing offer to known brands, advertising agencies, corporations, affiliates and other providers of advertising content. Data correlation module 204 searches the extracted dataset for key properties than can include brand and/or product name, telephone number, website address, mail address, audio keywords, printed keywords, logos, pictures and offering layout.

The brand and/or product name can establish direct or indirect ownership of the advertising content of the document or video. Advertising databases 120 and third party sources 122 can be searched to obtain advertising offerings corresponding to the identified brand and/or product name.

The telephone number can comprise a toll-free phone number that may be included in the document or video. Once extracted, the toll-free phone number can be correlated against toll-free phone numbers in advertising databases 120.

The website address is a uniform resource code (URL) to a website that may be listed in the document or identified in the video. The website can be correlated against existing URLs in the advertising offering database.

The mail address is an address that may be listed in the document or identified in the video. The mail address can be correlated against existing addresses in the advertising offering database.

The audio keywords correspond to an audio section of the video that can be distinctly identified. For example, the audio keywords can correspond to similar words in a jingle, a slogan or keywords associated with an advertisement. The data correlation module 204 can store a plurality of such audio keywords and attempt to match the audio keywords to the audio in the video. Once identified, the audio keywords can be correlated against audio keywords in the advertising offering database.

The printed keywords can be used to search the document for matching keywords in the document. The printed keywords can be representative of advertising categories, such as financial services, real estate, car dealerships, retailers, tourism, travel and other categories. The keywords for each category can be statistically representative of the category. For example, the financial services category can include keywords such as "interest rate," "%," "credit card," "loan," "refinance," and other similar terms. As another example, the real estate category can include "new homes," "apartments," "mortgage," "bedrooms," "square feet," "lot" and other similar terms. Some or all of the printed keywords can also be included as part of the audio keywords.

The logos and pictures can be embedded in the document. The data correlation module 204 can identify the logos and pictures in the document and attempt to correlate the identified logos and pictures with similar logos and pictures in the advertising offering database.

The offering layout can comprise a specific template from which the document is created. Different advertisers can use different templates that can be distinguished by description and location of content, number and location of columns, type of fonts, location and size of graphic objects and any other element that can be used in the composition of the template.

The example supplemental information module 206 generates requests for supplemental information based on information received regarding matched advertising offerings. The information regarding the matched advertising offers can comprise information received from B2C portal server computer 112 or from B2B portal server computer 116 regarding the scanned product or video advertisement. The information received can include an identification of the scanned product or video advertisement and an identity of an advertiser associated with the advertisement.

The requests for the supplemental information can include requests for information such as internal consumer feedback, external consumer feedback, feedback from publishers and professional organizations, feedback from organizations that may have a brand associated with the product and feedback from advertisers. The requests for the supplemental information can be in the form of API commands that can be sent to API interfaces of one or more of B2C portal server computer 112 and B2B portal server computer 116.

When the supplemental information from B2C portal computer 112 and from B2B portal server computer 116 are received, supplemental information module 206 can also calculate coefficients and weightings used in an equation to calculate a scam score for the scanned product or video advertisement, as discussed next herein. A more detailed discussion regarding a calculation of the coefficients and weightings is provided later herein.

The example scam level assessment module 208 can calculate a scam score for the document or video being examined. The scam score can be calculated using a formula based on data obtained from advertising service providers 118, advertising databases 120 and third party sources 122. The data obtained can be categorized into specific score categories that can be used by the formula. In an example implementation, the specific score categories can comprise internal consumer feedback scores, external consumer feedback scores, professional review scores, brand scores and advertiser scores. In addition, each score category can be weighted.

The internal consumer feedback score is based on a user's profile, such as age group, gender, race, estimated income, geography, social postings and other data that can be obtained from public or private records.

The external consumer feedback score can be derived from consumer or professional review websites that have captured consumer feedback associated with a particular advertising product. External consumer feedback can be segmented based upon professional affiliation, reputation, social activity, number of reviews, consumer feedback of the review, age group, gender, race, and other information that can be retrieved from public or private records.

Professional review can include feedback regarding professional organizations, such as advertising agencies, that publish advertising offers and that can represent the interest of the owner of the product being advertised. A publisher's organization that is consistently associated with advertised products with a positive customer feedback is typically ranked higher than an organization with mixed or negative feedback. Other factors considered regarding the professional organizations can include reputation, monetary valuation, yearly volume of business, number of advertising campaign overtime, number of employees, number of corporate clients and number of branch offices. Other factors are possible.

Brand scores can comprise historical ratings associated with brand ownership in relation to customer feedback. For example, a brand that is consistently associated with advertised products having positive customer feedback is ranked higher than another brand's organization with mixed or negative feedback. Other data used to determine brand scores can include reputation, age of the brand, monetary valuation of the brand, yearly volume of business, number of products, number of employees and active market geography.

The advertiser scores comprise a ranking based on a reputation of advertisers and advertising agencies responsible for the advertisement. Factors on which the reputation can be based can include monetary valuation of an advertising agency, yearly volume of business, number of advertising campaign overtime, number of employees, number of corporate clients and number of branch offices. Other factors are possible.

In an example implementation, one example scam score can be calculated using the following equation (1):

$$\text{Scam Score} = \sum_{i=1}^{N_1} C_i \times W_{C_i} + \sum_{j=1}^{N_2} E_j \times W_{E_j} + \sum_{k=1}^{N_3} R_k \times W_{R_k} + \sum_{i=1}^{N_4} B_i + W_{B_i} + \sum_{m=1}^{N_5} A_m + W_{A_m} \quad (1)$$

Where:
$C_i$ represents an internal consumer feedback score
$W_{C_i}$ represents a weighting for the internal consumer feedback score
$E_j$ represents an external feedback score
$W_{E_j}$ represents a weighting for the external feedback score
$R_k$ represents a professional review score
$W_{R_k}$ represents a weighting for the professional review score
$B_i$ represents a brand score
$W_{B_i}$ represents a weighting for the brand score
$A_m$ represents an advertisers score
$W_{A_m}$ represents a weighting for the advertisers score In the above equation, the scam score is calculated by summing weighted internal consumer feedback scores, weighted external consumer feedback scores, weighted professional review scores, weighted brand scores and weighted advertising scores.

Each internal consumer feedback score corresponds to feedback from a registered user of a mobile AR scam detection device, similar to AR mobile device 102. B2C portal server computer 112 can compile a list of users of the mobile AR scam detection device and obtain feedback information from the registered users from one of third party sources 122, such as social media sources. Supplemental information module 206 can evaluate the internal consumer feedback information and generate a score (for example a number from 1 to 10) corresponding to the feedback information. In an example implementation, a score of 10 can correspond to a high score, indicating a high level of confidence with the advertiser and/or advertising product and a score of 1 can correspond to a low score. Scam detection processing module 104 can assign the weighting $W_{C_i}$ for the internal consumer feedback score. In an example implementation, the weighting for each internal consumer feedback score is the same.

Each external consumer feedback score corresponds to feedback from a consumer review website. Supplemental information module 206 can evaluate the external consumer feedback information and generate a score (for example a number from 1 to 10) corresponding the feedback information. Scam detection processing module 104 can assign the weighting $W_{E_j}$ for the external consumer feedback score.

Each professional review score corresponds to feedback from a professional review website. Supplemental information module 206 can evaluate the professional review feedback information and generate a score (for example a number from 1 to 10) corresponding the feedback information. Scam detection processing module 104 can assign the weighting $W_{R_k}$ for the professional review feedback score.

Each branding score corresponds to feedback from organizations that brand a product associated with the advertisement. The product is typically branded by at least one organization. The brand can correspond to the name of the organization, for example Good Housekeeping, one of the organization's affiliates or associated trademarks. Content processing module 114 can evaluate the branding feedback information and generate a score (for example a number from 1 to 10) corresponding the feedback information. Scam detection processing module 104 can assign the weighting $W_{B_l}$ for the branding feedback score.

Each advertising score corresponds to feedback from advertisers regarding the product associated with the advertisement or regarding the advertiser associated with the advertisement. Supplemental information module 206 can evaluate the advertising feedback information and generate a score (for example a number from 1 to 10) corresponding the feedback information. Scam detection processing module 104 can assign the weighting $W_{R_k}$ for the advertising feedback score.

In another example equation (2) for calculating a scam score, in addition to weighting factors, different multiplication factors can be applied to predefined score categories, as shown in the following equation. Other example equations are possible.

$$\text{Scam score} = 2\sum_{i=1}^{N_1}(C_i \times W_{C_i}) + 0.5\sum_{j=1}^{N_2}(E \times W_{E_j}) + \\ 3\sum_{k=1}^{N_3}(R_k \times W_{R_k}) + 2\sum_{i=1}^{N_4}(B_i + W_{B_l}) + 0.3\sum_{m=1}^{N_5}(A_m + W_{A_m}) \quad (2)$$

Where the coefficient definitions are the same as for the previous equation above herein.

The calculated scam score can be normalized against other similar advertising products. For example, for a set of advertising scores $A=[a_1, a_2, \ldots a_N]$ having a respective scam score s in a set $S=[s_{a1}, s_{a2}, \ldots s_{aN}]$, scam detection processing module 104 can normalize the scam score $s_{ai}$ for an advertising a by the following equation:

$$\text{Scaled}_{s_{ai}} = \frac{s_{ai} - \min(S)}{\max(S) - \min(S)}$$

where Scaled $s_{ai}$ represents a normalized scam level for the advertising $a_i$.

Alternatively, a normalized scam score can comprise normalizing a scam score $s_{ui}$ for an advertising $a_i$ to a mean and standard deviation of a set A of advertising scores. The set A of advertising scores can be selected based on one or more common characteristics shared by the advertisings, such as a brand, geography, type of product or promotional timing of the advertisings.

Scam level assessments can be presented as either a number within a range, a letter of the alphabet a visual color-coded icon or a combination. For example, a scam score of 8 in a range of 1 to 10 indicates to the user a high probability of scam for the advertisement being viewed. In another example, a scam level assessment of D in a range between A and F also indicates to the user a high probability of scam content for the advertisement being viewed. In yet another example, a green icon for a scam level assessment in a visualized scoring range between green, orange and red indicates to the user a low probability of scam content.

Figure 3:
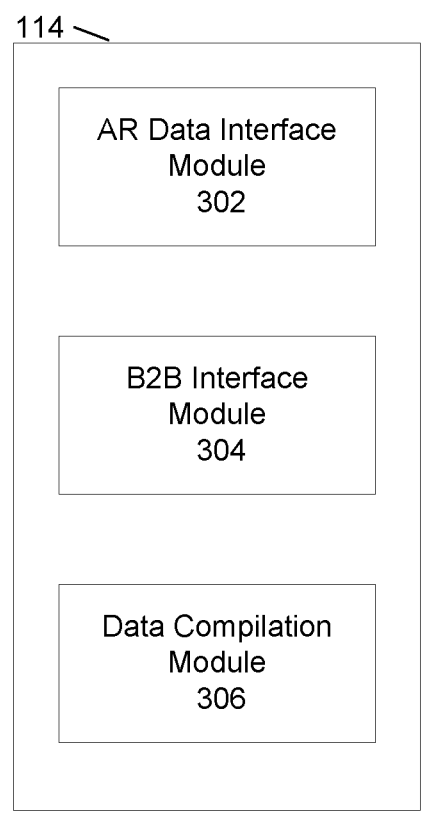
FIG. 3 shows example modules of the content processing module of FIG. 1.

FIG. 3 shows example modules of content processing module 114. Content processing module 114 includes AR data interface module 302, B2B interface module 304 and data compilation module 306. More, fewer or different modules are possible.

The example AR data interface module 302 process data requests from AR mobile device 102 and sends obtained data based on the data requests to AR mobile device 102. In an example implementation using the system and methods, the data requests comprise API commands sent from AR mobile device 102 to B2C portal server computer 112. AR data interface module 302 processes the API commands and determines what data is requested and where to obtain the data. When the data is to be obtained from advertising databases 120 or third party sources 122, in some implementations, AR data interface module 302 can request the data directly from advertising databases 120 and/or third party sources 122. In other implementations, AR data interface module 302 can send the data requests to B2B interface module 304 and B2B interface module 304 can request the data from advertising databases 120 and/or third party sources 122.

For example, AR data interface module 302 can receive a request from AR mobile device 102 for advertising offerings that match key items of actionable content in the request. For an implementation where B2C portal server computer 112 can access advertising databases 120 and/or third party sources 122 directly, AR data interface module 302 reformats the request into API formats corresponding to advertising databases 120 and/or third party sources 122. AR interface module 302 then sends the reformatted request to one or more of advertising databases 120 and/or third party sources 122. For an implementation, where B2B portal server computer 116 is used access advertising databases 120 and/or third party sources 122, AR data interface module 302 forwards the request to B2B interface module 304. In addition, for requests to advertising service providers 118, AR data interface module 302 forwards the request to B2B interface module 304.

AR data interface module 302 also maintains a dataset catalog and metadata catalog of API commands. The dataset catalog stores a listing of dataset actionable content items included in data requests received by AR data interface module 302. The metadata catalog of API commands stores a listing of API commands used by databases and service providers that can be accessed from B2C portal server computer 112. The dataset catalog and metadata catalog of API commands are updated when changes are made to the actionable content items and to the API commands.

The example B2B interface module 304 receives data requests from AR data interface module 302 and translates the data requests, when necessary, into API commands that can be used by B2B portal server computer 116. B2B portal server computer 116 can use the API commands to access data from one or more of advertising service providers 118, advertising databases 120 and third party sources 122.

The example data compilation module 306 processes data received from advertising service providers 118, advertising databases 120 and third party sources 122. Data compilation module 306 organizes the data received into collections of advertising offerings, advertising agencies, brands ownership, third party data and other data categories. Data compilation module 306 also can support analytical applications such as reporting and trends for the data received. After the data received is processed, data compilation module 306 provides the data received to AR data interface module 302 for transmission to AR mobile device 102.

Data compilation module 306 can also compile information regarding competitive advertising offerings. The competitive advertising offerings are advertising offerings that are similar to the scanned product or video advertisement. The competitive advertising offerings can be uploaded to advertising databases 120 from advertising service providers 118 such as professional advertisers. Data compilation module can provide the competitive advertising offers to AR data interface module 302 for delivery to AR mobile device 102. One or more of the competitive advertising offerings can be displayed to the user on AR mobile device 102 as an alternative to the scanned product or video advertisement.

Figure 4:
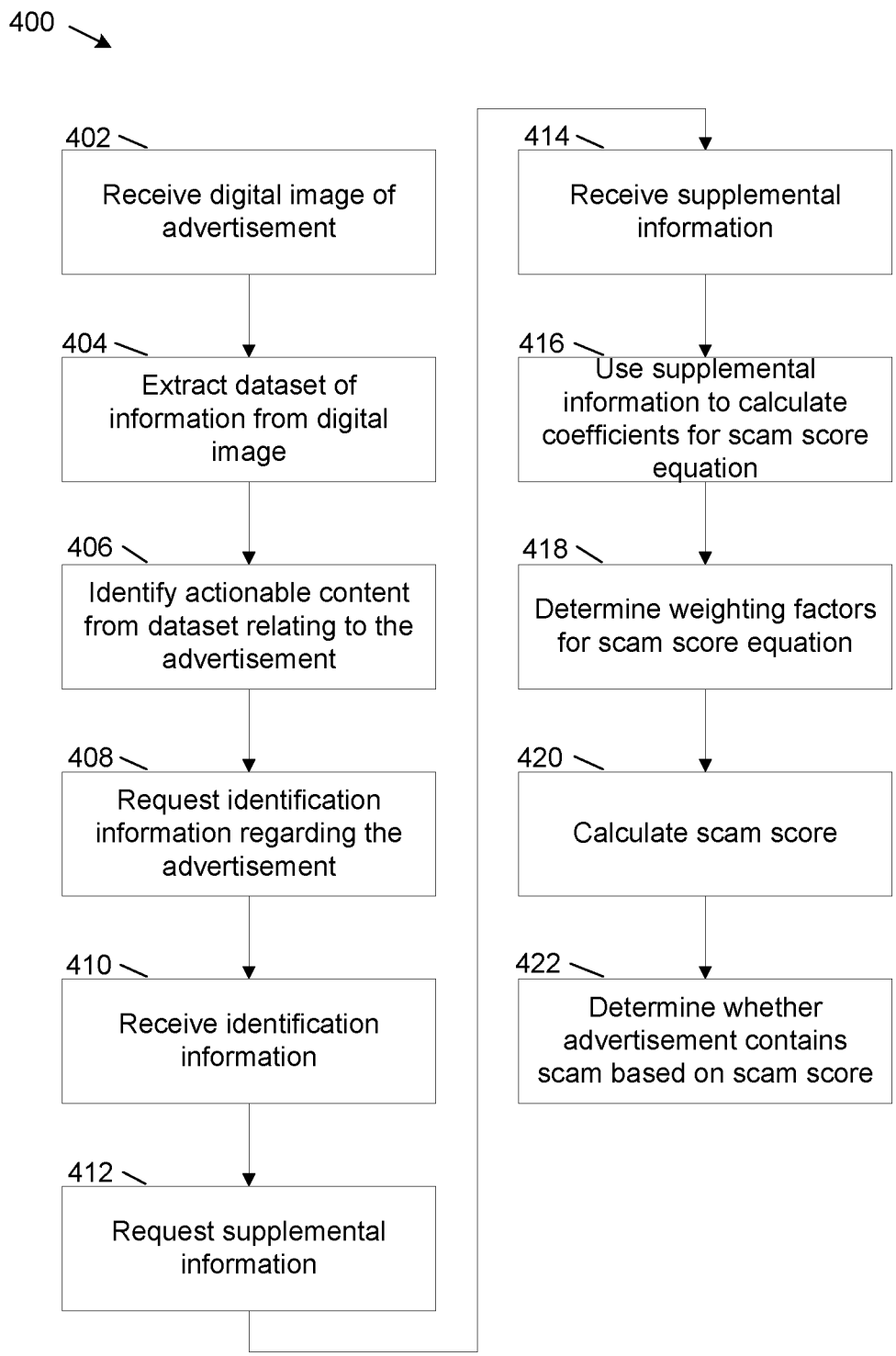
FIG. 4 shows an example method for determining whether a viewed advertisement contains fraudulent content.

FIG. 4 shows a flowchart of an example method 400 for determining whether a viewed advertisement contains fraudulent content (scam). For method 400, the advertisement is contained within a printed document that can be viewed by a user of AR mobile device 102. As discussed earlier herein, the advertisement can comprise a video advertisement that can be viewed by the user of AR mobile device 102.

At operation 402, a camera on AR mobile device 102 scans the printed advertisement and AR mobile device 102 receives a scanned digital image of the printed advertisement.

At operation 404, a dataset of information is extracted from the scanned digital image. The dataset can be extracted using one or more of several techniques, including video frame de-interleaving, key frame interpolation, picture alignment, picture aspect ratio normalization, audio filtering and key words deconstruction, logo extraction, page layout analysis, line and word detection, character segmentation and phone number and website address identification. Other techniques are possible. The dataset can comprise one or more words, phrases, audio tracks, logos and pictures that may be extracted from the scanned image.

At operation 406, actionable content related to the advertisement is identified from the dataset. As used in this disclosure, actionable content is one or more properties of the dataset that can be used to permit the user to initiate an action related to the viewed advertisement. Example actions can include searching for a brand or product name associated with the advertisement in a database or requesting information regarding the brand or product name from a third party source. Other actions can include using a toll-free telephone number in the advertisement, using a URL for a website contained in the advertisement, and using keywords found in the advertisement to perform searches of the databases or third party sources.

At operation 408, the actionable content is used to request identification information regarding the advertisement. The identification information can comprise a product name, a brand, a name of an advertiser or other information that can be used to identify the printed advertisement. For example method 400, the identification information is requested by sending one or more API commands to B2C portal server computer 112.

The API commands can comprise query commands for data associated with the printed advertisement. Each query command can include as parameters one or more of the actionable content. One example API command can comprise Query(product name), where the intent of the command is to obtain information regarding the product name, where product name can be a keyword extracted from the data set. Another example API command can comprise Advertisers (financial services), where the intent of the API command is to discover advertisers associated with financial services, where "financial services" is a keyword extracted from the dataset.

For method 400, B2C portal server computer 112 can translate the API commands received into other API commands that can be used to access one of advertising databases 120 to attempt to find a match in advertising databases 120 for the advertisement.

At operation 410, information requested at operation 408 is returned to AR mobile device 102. The information can be based on a match for the advertisement in one of advertising databases 120. The information can comprise item identification information such a name of the advertisement, a name of a product being advertised in the advertisement, a name of a company associate with the product and an advertiser associated with the advertisement. Other identification information is possible.

At operation 412, supplemental information is requested regarding the printed advertisement. The supplemental information can comprise additional information regarding the advertisement identified at operation 412. The supplemental information can include one or more of internal consumer feedback, external consumer feedback such as consumer or professional reviews of the advertisement, ratings of professional organizations such as the advertising agency responsible for the advertisement and ratings of a brand associated with the advertisement.

The request for the supplemental information can comprise one or more API commands that are sent to B2C portal computer 112. The API commands can comprise one or more query commands with the specific type of requested supplemental information included as parameters in the query commands.

When B2C portal computer 112 receives the query commands, content processing module 114 can parse the commands and translate the commands into one or more API commands used by one or more of advertising service providers 118 and third party sources 122. For method 400, B2C portal computer 112 can send the translated API commands to B2B portal server computer 116. B2B portal server computer 116 can then access one or more of advertising service providers 118 and third party sources 122 via network 110 to obtain the supplemental information. For example, one or more of advertising service providers 118 can supplemental information regarding ranking and reputation of the advertising agency associated with the advertisement. One or more of third party sources 122 can provide supplemental information regarding professional reviews of the printed advertisement. Other examples are possible.

At operation 414, the requested supplemental information is received from B2C portal server computer 112. B2C portal server computer 112 can receive the supplemental information from B2B portal server computer 116 after B2B portal server computer 116 receives the supplemental information from one or more of advertising service providers 118 and third party sources 122.

At operation 416, supplemental information module 206 of scam detection processing module 104 uses the supplemental information to calculate coefficients for the scam score equation used to determine fraudulent content in the advertisement. Supplemental information module 206 calculates the coefficients by analyzing the supplemental information and generating a value for each coefficient in the scam score equation based on the analysis of the supplemental information. Supplemental information module 206 can parse the supplemental information and assign a score in a range for each category of supplemental information. For method 400, the range can be between 1 and 10, where 10 represents a score for the category of supplemental information indicative of a high risk of scam and 1 represents a score indicative of a low risk of scam.

As discussed earlier herein, the coefficients in the scam score equation include categories of internal consumer feedback scores (C), external consumer feedback scores (E), professional review scores (R), brand category scores (B) and advertisers scores (A). As an example of how supplemental information can be used to calculate coefficients for these categories, when internal consumer feedback scores from registered users of scam detection AR mobile devices consistently indicate a low risk of scam for the printed advertisement, the internal consumer feedback scores $C_i$ for each of these users can be given a value ranging from 1 to 3. As another example, when a professional reviewer provides supplemental information indicating that a printed advertisement has a high risk of scam content, a coefficient Pi associated with the professional reviewer can be given a value ranging from 8 to 10. Values for coefficients of other categories can be assigned in a similar manner, based on the degree of scam risk indicated by the supplemental information.

At operation 418, weighting factors are determined for the scam score equation (1) described above, herein. As shown in equation (1), each feedback category represented by a coefficient can have a different weighting factor. In addition, for a particular category, each feedback value for a coefficient in the category can have a different weighting factor. However, for method 400, for each particular category the weighting factors are the same for all feedback values for the coefficient in the category.

The weighting factors indicate an importance of a category in calculating the scam score for the advertisement. Categories having a higher weighting factor have a greater impact in determining the scam score than categories having a lower weighting factor. The weighting factors are typically predetermined based on the scam score equation being used and the categories used for the scam score equation.

At operation 420, the scam score for the printed advertisement is calculated. For method 400, the scam score is calculated using equation 1 from the coefficients determined at operation 416 and the weighting factors determined at operation 418.

At operation 422, the scam score is evaluated to determine whether the printed advertisement contains fraudulent material (scam) based on the scam score. The determination that the printed advertisement contains scam can be made when the scam score is greater than a predetermined value. The predetermined value can be based on historical scam score calculations and an identification of scam in printed advertisements based on calculated scam scores. In some implementations, the predetermined value can be preset in the software application for AR mobile device 102 that includes scam detection processing module 104. In some implementations, the predetermined value can be configurable.

In some implementations, there can be more than one predetermined value. For example, one predetermined value can represent a threshold of a high risk of scam content. Another predetermined value can represent a high likelihood that the printed advertisement includes scam content. In an example implementation where calculated scam scores can have a range of 1 to 10, where 10 represents the probability of scam content, a predetermined threshold value of 8 can indicate a high risk of scam content and a predetermined threshold value of 9 can indicate a high likelihood of scam content. Other predetermined values are possible.

As illustrated in the example of FIG. 5, AR mobile device 102 includes at least one central processing unit ("CPU") 502, also referred to as a processor, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the AR mobile device 102, such as during startup, is stored in the ROM 512. The AR mobile device 102 further includes a mass storage device 514. The mass storage device 514 is able to store software instructions and data. Some or all of the components of the AR mobile device 102 can also be included in B2C portal server computer 112 and B2B portal server computer 116.

The mass storage device 514 is connected to the CPU 502 through a mass storage controller (not shown) connected to the system bus 522. The mass storage device 514 and its associated computer-readable data storage media provide non-volatile, non-transitory storage for the AR mobile device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the AR mobile device 102.

According to various embodiments of the invention, the AR mobile device 102 may operate in a networked environment using logical connections to remote network devices through the network 110, such as a wireless network, the Internet, or another type of network. The AR mobile device 102 may connect to the network 110 through a network interface unit 504 connected to the system bus 522. It should be appreciated that the network interface unit 504 may also be utilized to connect to other types of networks and remote computing systems. The AR mobile device 102 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the AR mobile device 102 can store software instructions and data. The software instructions include an operating system 518 suitable for controlling the operation of the AR mobile device 102. The mass storage device 514 and/or the RAM 510 also store software instructions and software applications 516, that when executed by the CPU 502, cause the AR mobile device 102 to provide the functionality of the AR mobile device 102 discussed in this document. For example, the mass storage device 514 and/or the RAM 510 can store software instructions that, when executed by the CPU 502, cause the AR mobile device 102 to display received data on the display screen of the AR mobile device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for detecting fraudulent content over a computer network, the method comprising:
   obtaining a document over a computer network;
   extracting a dataset of information from the document;
   identifying content related to the document based on the dataset of information;
   using the identified content, requesting identification information regarding the document;
   using the identification information to request supplemental information regarding the document;
   calculating, using the supplemental information,
      a consumer feedback score based on feedback of a user; and
      a professional review score based on a professional review; and
   using the consumer feedback score and the professional review score, calculating a fraudulent content score for the document that indicates a likelihood that the document includes fraudulent content.

2. The method of claim 1, further comprising:
   calculating, using the supplemental information, a brand score,
   wherein the fraudulent content score is further calculated using the brand score.

3. The method of claim 1, wherein the identified content comprises one or more words or phrases in the dataset of information that can be used to identify the document in a database.

4. The method of claim 1, wherein the identified content comprises one or more of a product name, a brand name or one or more keywords that can correspond to a category associated with the document.

5. The method of claim 1, wherein the identified content comprises one or more of a telephone number, a mailing address or a uniform resource code (URL) included in the document.

6. The method of claim 1, wherein calculating the fraudulent content score includes calculating a weighted consumer feedback score and a weighted professional review score.

7. The method of claim 1, wherein calculating the consumer feedback score includes:
   obtaining the feedback of the user from a third-party source; and
   evaluating the feedback to calculate the consumer feedback score.

8. The method of claim 1, further comprising:
   responsive to the fraudulent content score being greater than a predetermined threshold, determining that the document contains the fraudulent content.

9. The method of claim 1, further comprising:
   presenting a visual icon representative of the fraudulent content score.

10. The method of claim 1, wherein one or more operations of the method are performed by an augmented reality device.

11. A method for detecting fraudulent content, the method comprising:
    obtaining a video over a computer network;
    extracting a dataset of information relating to the video;
    identifying content related to the video based on the dataset of information;
    using the identified content, requesting identification information regarding the video;
    using the identification information, requesting supplemental information regarding the video;
    calculating, using the supplemental information,
       a consumer feedback score based on feedback of a user; and
       a professional review score based on a professional review; and
    using the consumer feedback score and the professional review score, calculating a fraudulent content score for the video that indicates a likelihood that the video includes fraudulent content.

12. The method of claim 11, wherein to extract the dataset of information includes:
    extracting content from the video by performing video frame de-interleaving, key frame interpolation, picture alignment, picture aspect ratio normalization, audio filtering and key words deconstruction, logo extraction, page layout analysis, line and word detection, character segmentation, or phone number and website address identification.

13. The method of claim 11, wherein obtaining the video over the computer network includes streaming the video over the Internet or a downloaded the video over the Internet.

14. The method of claim 11, wherein the dataset of information includes audio keywords corresponding to an audio section of the video.

15. The method of claim 11, further comprising:
    calculating a brand score using the supplemental information,
    wherein the fraudulent content score is further calculated using the brand score.

16. The method of claim 11, wherein the identified content comprises one or more words or phrases in the dataset of information that can be used to identify the video in a database.

17. The method of claim 11, wherein the identified content comprises one or more of a product name, a brand name or one or more keywords that can correspond to a category associated with the video.

18. The method of claim 11, wherein the identified content comprises one or more of a telephone number, a mailing address or a uniform resource code (URL) included in the video.

19. The method of claim 11, wherein calculating the fraudulent content score includes calculating a weighted consumer feedback score and a weighted professional review score.

20. A system, comprising:
- at least one processor;
- a non-transitory computer-readable medium having instructions stored thereon that, when executed by the at least one processor, cause the at least one processor to:
  - obtain fraudulent content over a computer network, wherein the fraudulent content is a document or a video;
  - extract a dataset of information from the fraudulent content;
  - identify content related to the fraudulent content based on the dataset of information;
  - use the identified content to request identification information regarding the fraudulent content;
  - use the identification information to request supplemental information regarding the fraudulent content;
  - calculate, using the supplemental information,
    - a consumer feedback score based on feedback of a user; and
    - a professional review score based on a professional review;
  - use the consumer feedback score and the professional review score to calculate a fraudulent content score for the fraudulent content that indicates a likelihood that the fraudulent content includes the fraudulent content;
  - responsive to the fraudulent content score being greater than a predetermined threshold, determine that the fraudulent content is the fraudulent content; and
  - present a visual icon indicating the fraudulent content is the fraudulent content.

* * * * *